Oct. 18, 1960 G. F. QUAYLE 2,956,700
LOAD CLAMP FOR INDUSTRIAL TRUCK
Filed April 22, 1955 3 Sheets-Sheet 1

INVENTOR.
George F. Quayle
BY
*H. H. Golden*
ATTORNEY

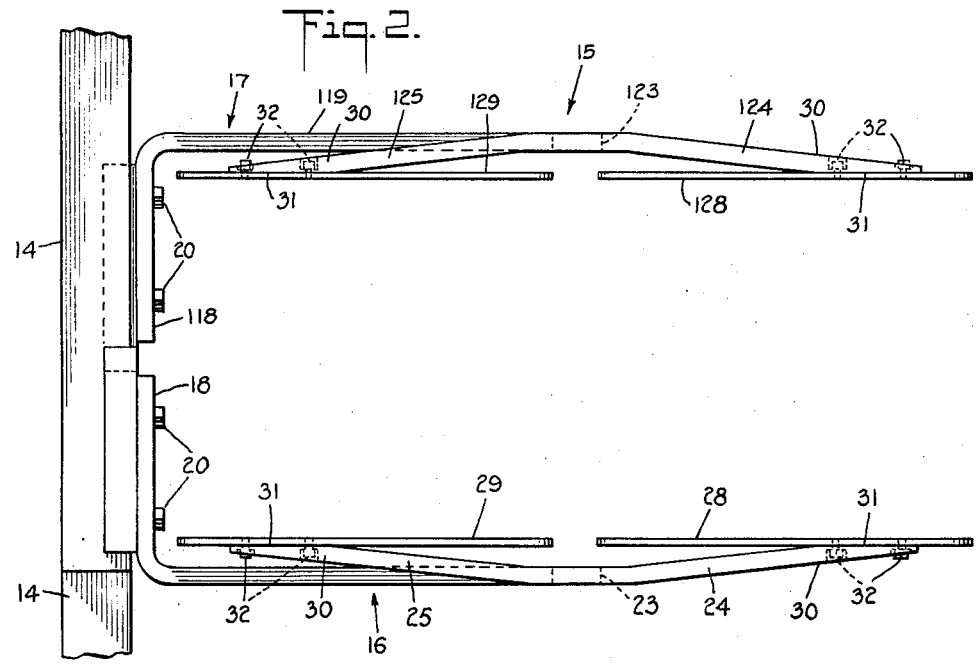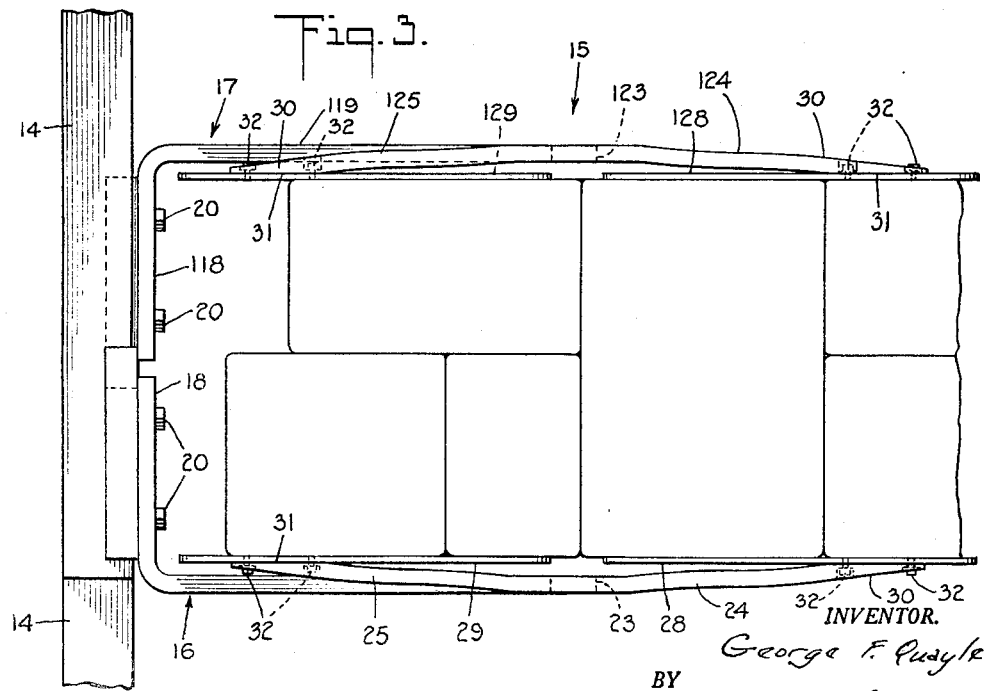

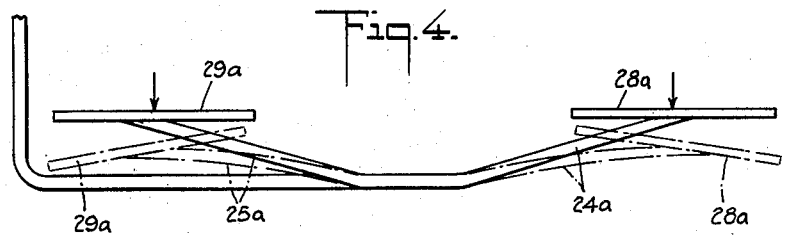
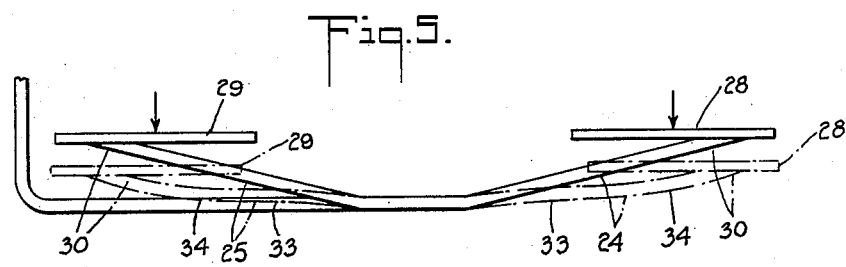
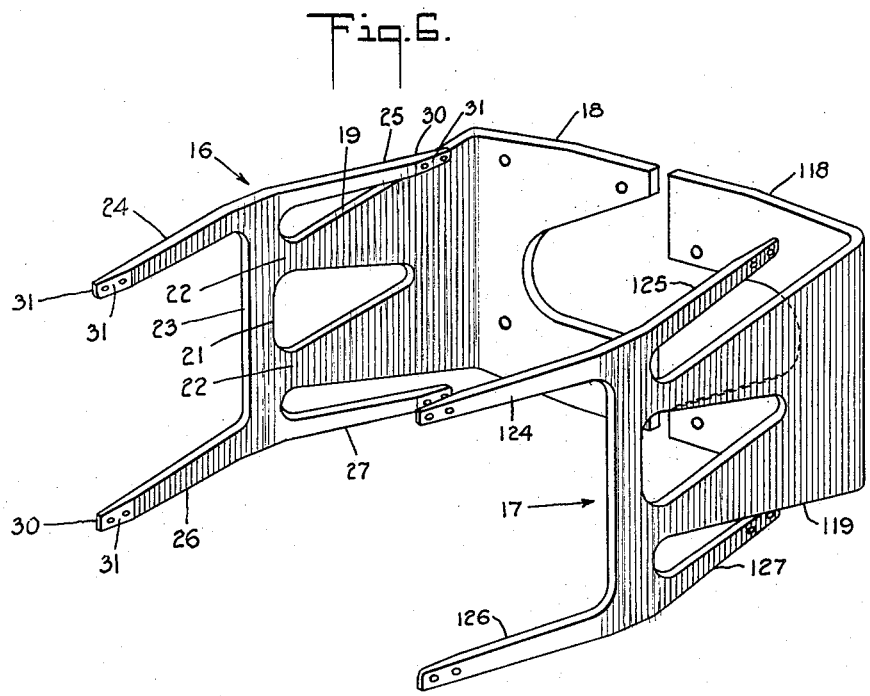

United States Patent Office 2,956,700
Patented Oct. 18, 1960

2,956,700
LOAD CLAMP FOR INDUSTRIAL TRUCK

George F. Quayle, Philadelphia, Pa., assignor to The Yale & Towne Manufacturing Company, Stamford, Conn., a corporation of Connecticut Filed Apr. 22, 1955, Ser. No. 503,053

8 Claims. (Cl. 214—655)

This invention relates to the mounting of clamping pads on an industrial truck for movement toward and away from one another. The clamping pads are usually of relatively large area and are used to clamp cartons or similar packages so that they may be transported by the industrial truck without the aid of skids or pallets. Those skilled in the art appreciate that there is considerable variation in carton sizes and that the clamping pads must therefore be adapted to adjust themselves so as to compensate for such variations, thereby permitting a substantial grip by the pads on a large number of cartons that are to be picked up as a group.

The mounting of the clamps for articulation presents a very considerable problem since there are usually forward and rear pads mounted at each side of the truck, these pads being required to articulate individually and also relatively to one another. The pads and their mounting means must not occupy a great deal of room, it being appreciated that the room they do occupy, plus the space through which they must move in gripping and releasing the cartons, is all wasted. Thus, in depositing a series of loads along a wall, it will be necessary to leave enough space between the loads to permit the movement of the clamps and their mounting means into the spaces, while allowing also for the lateral movement that must take place if the pads are to grip and release the load. While much time and effort has been devoted to the particular problem by men skilled in the art, so far as I know, no clamping pad mounting of the prior art has been successful, even though resort has been had to rubber mountings, pivot mountings, lever assemblies, etc.

As a feature of my invention, I mount each clamp pad so that it is secured to its support means at a point offset longitudinally relatively to the area of the clamp pad. Then when the clamping pad is applied to a load, it tends to twist its support means whereby to maintain itself in alignment with the load. In other words, pressure between the pad and the load will tend to maintain the pad in alignment with the load through the twisting or bending of the means on which the pad is carried or secured.

As a further feature of my invention, I secure each load clamping pad on an arm or finger that is adapted for bending and twisting by the pad through the offset securing means between the pad and the arm or finger. As still a further feature of my invention, the arms or fingers to which my pads are secured, are formed inclined inwardly toward the longitudinal center of the truck so that the pads, through the offset securing means, tend to align with the load by bending or twisting the arms or fingers, while simultaneously reacting against the arms or fingers to press them in a direction away from the longitudinal center of the truck.

As a still more detailed feature of my invention, I form the fingers or arms as part of a plate, the plate being cut away to outline or define the fingers. Since, preferably, there are two pads at each side of the truck, each plate is cut away to form two upper and two lower fingers, the fingers having a certain amount of resiliency due to the fact that they are part of a large plate and are formed to taper inwardly toward the longitudinal center of the truck out of the plane of the remainder of the plate.

Each plate from which the arms are formed is bent at one end to be secured to means for sliding the plates toward and away from one another. Because of this bend, each plate yields not only at its fingers or arms for the operation of the clamp pads, but yields also at its bend, thereby contributing a most effective clamping structure for such relatively yielding loads as cartons and the like.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

In the drawings:

Fig. 2 shows the opposed arms of my clamp in plan view.

Fig. 3 shows the arms in position clamping a load.

Figs. 4 and 5 are diagrammatic views to illustrate the bending action of the clamp arms.

Fig. 6 is a perspective view showing details of the clamp arms.

Figure 1:
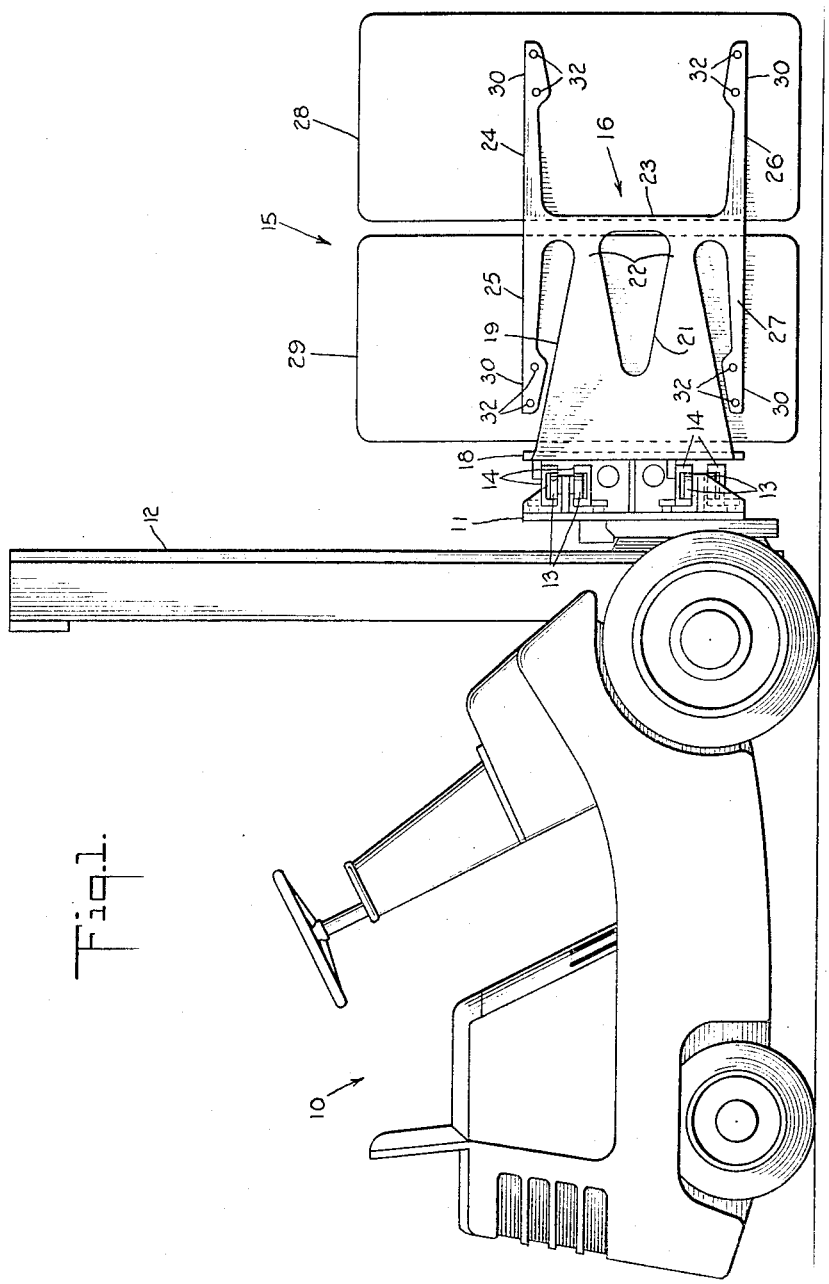
Fig. 1 is a side view showing my novel load clamp mounted on a lift truck.

For the purpose of describing my novel load clamp, I show in Fig. 1 a lift truck 10 having a load carriage 11 that moves in the usual way on vertical uprights 12. I further show on the load carriage 11 a series of rollers 13 and horizontal channels 14 through which I support my novel clamping srtucture, this structure being indicated generally by the numeral 15. Only one side of the clamping structure 15 is visible in Fig. 1, but it will be appreciated that this structure has opposed sides that move linearly toward one another on the rollers 14 for clamping a load, as may be seen in Fig. 3. This mounting arrangement is rather usual in load clamps of the particular class, as will be recognized by those skilled in the art, and is shown merely by way of example. It is important to know principally that the sides of the load clamp 15 move linearly to clamp a load so that the load can be lifted by the truck carriage, and therefore I shall not describe the mounting in further detail.

The extremely novel load clamp 15 that I have now conceived has at opposed sides a pair of forwardly extending clamp arms 16, 17, as may be seen in Figs. 2, 3, and 6. Each clamp arm 16, 17 has a particular integral construction that I shall describe, and, in the preferred form of my invention, each of these arms is formed from a single flat plate of high carbon steel. Since I prefer to make the clamp arms 16, 17 alike, with one arm merely inverted to lie in opposed relation to the other, a description of one of these arms will suffice for both.

Referring particularly to Figs. 1 and 6, it will be seen that the plate from which the arm 16 is formed is bent at right angles whereby to provide a mounting portion 18 and a main portion 19. The mounting portion 18 is attached to the corresponding channels 14 on the truck carriage 11 through suitable means such as bolts 20, so that the main arm portion 19 normally extends forwardly parallel to the truck axis. I so cut the main portion 19 that its top and bottom edges taper forwardly, and I further form an opening 21 intermediate these edges whereby this portion 19 has relatively narrow upper and lower sections 22 at its forward end. These narrow sections 22 have a particular purpose incidental to yielding movement of the arm 16, as will be fully described in due course.

Just beyond the narrow sections 22, I cut the clamp arm 16 to form a vertical shaft portion 23 that extends above and below the main portion 19 of the arm. Integral with the upper end of shaft portion 23, I form a pair of yieldable forwardly and rearwardly extending fingers 24, 25, and on the lower end of shaft portion 23, I form similar yieldable fingers 26, 27. At their juncture with the vertical shaft portion 23, I bend the fingers 24, 25, 26, and 27 inwardly so that these fingers normally taper at a small angle toward the longitudinal axis of the truck.

I equip the forward clamp fingers 24, 26 and rearward clamp fingers 25, 27 with a pair of flat clamp pads 28, 29, Figs. 1, 2, and 3. These clamp pads 28 and 29 have a large vertical surface area whereby they are adapted to lie in contact with one side of a relatively large stack of cartons. The manner in which I attach the clamp pads 28 and 29 to the clamp fingers 24, 25, 26, 27 is an extremely important part of my invention. Thus, each clamp pad 28, 29 is secured to its corresponding clamp fingers at a point longitudinally past the center of the pad. More in detail, the fingers 24, 25, 26, 27 of the arm 16 will extend past a medial portion of each corresponding pad 28, 29 while in spaced relation to the pad, then extending to the points at which the pads are secured to the fingers, all as is clearly indicated in Fig. Fig. 2. Therefore, it can be said, that medial points in the areas of the pads are offset longitudinally relatively to the ends 30 of the fingers to which they are secured. Preferably, also, the areas of the pads are offset vertically relatively to the fingers 24, 25, 26, 27, as is apparent in Fig. 1.

Further, I secure the pads 28, 29 in integral relation to the end portions 30 of the fingers 24, 25, 26, 27. I prefer to mill each end portion 30 at a bevel to form a flat seating surface 31, Figs. 2 and 3, and I secure the pads 28, 29 against these surfaces 31 through bolts 32. Actually other securing means might be used, it being important only that each pad be supported for alignment to the load, and against pivoting relatively to its supporting fingers. The angle of the seating surfaces 31 is such as to hold the clamp pads 28, 29 parallel to the truck axis when the fingers 24, 25, 26, 27 are in an unstressed condition, as in Fig. 2. In this arrangement, obviously, the clamp pads 28, 29 do not move relatively to the end portions 30 of the clamp fingers 24, 25, 26, 27, but do yield through bending movements that take place in the fingers and arm 16 when clamping a load. These bending movements act in an extremely novel way, and not only enable the pads 28, 29 to yield but also cause the pads to align themselves relatively to the surface of the load, as I shall now explain.

To understand fully the bending movements of my novel load clamp, it will be best to consider first a bending movement that is merely conventional, and that I illustrate diagrammatically in Fig. 4. Thus, I show in Fig. 4 clamp pads 28a, 29a, that are integrally attached to the ends of yielding fingers 24a, 25a, with the point of attachment at the vertical center of each pad. The pressure incidental to clamping a load will be applied from the center of the pads to the end of each finger 24a, 25a, as indicated by the arrows, and thereby will cause a simple outward bending movement of the fingers, as shown in broken lines. It will be observed that this conventional bending movement causes the pads 28a, 29a to move angularly from their original position, and the pads will therefore be out of aligned relation to a load surface. Fig. 5, on the other hand, shows diagrammatically the bending movements that take place in my extremely novel structure.

In Fig. 5, the pressure of the load naturally tends to bend the fingers 24, 25 of my novel clamp in an outward direction, as in Fig. 4. However, in my clamp the pressure actually bends only a portion of each finger in that way, as I indicate in broken lines at 33, Fig. 5. Since the pressure of the load at the center of the pads is now offset relatively to the end portions 30 of the fingers, as indicated by the arrows in Fig. 5, this pressure applies a very considerable bending moment to the fingers 24, 25, through their end portions 30. This bending moment is in a reverse direction, and causes the outer portion 34 of each finger to bend in a direction opposed to the bending of portion 33. Through this reverse bending action, the clamping pads 28, 29 tend to hold themselves in aligned relation to the load surface despite the pressure on the pads.

It will be understood I have exaggerated the bending of the fingers 24, 25, in Fig. 5 to illustrate the operation of my clamp. A similar reverse bending action does take place in each of the fingers 24, 25, 26, 27 when the clamp pads 28, 29 are in clamping relation to a load, as in Fig. 3. Of course, the main portion 19 of the clamp arm 16 will not bend to a very large extent because of its greater section. However, it is important to note that the relatively narrow sections 22, Figs. 1 and 6, can bend with relative ease. This bending of the sections 22 enables the clamp pads 28 and 29 better to align themselves with a load when the main portion 19 of the clamp arm deflects, or if for any reason the load surface and the main arm portion 19 do not lie in parallel relation to one another. During the operation of the clamp, the fingers 24, 25, 26, 27 act to apply greater pressure to the lower portions of the clamp pads 28, 29 because they are downwardly offset toward the lower ends of the clamp pads. Thereby, the pads 28, 29 when clamping a stack of cartons will apply greater pressure to the lower portion of the stack and are well able to support the bottom row of the stack.

In my novel load clamp, the arm 16, together with its fingers 24, 25, 26, 27, naturally performs as a continuous beam with the bending forces accepted throughout the beam, but with bending controlled through the particular form of the arm and fingers. This enables me to make the clamp arm 16 extremely thin so that it can enter a relatively narrow space between a load and a wall, or between two loads, for the purpose of picking up a load. I do not require pivots, springs, or other additional parts for articulating and controlling the yielding movements of the clamp pads 28, 29. Moveover, the inwardly inclined relation of the clamp fingers 24, 25, 26, 27, together with the integral construction of my clamp arm 16, enables me to obtain very satisfactory operation with the clamp arm 16 and pads 28, 29 mounted parallel to the truck axis. Thereby the clamp arm 16 does not have "toe-in" and is better able to enter a narrow space.

I have already stated that the clamp arms 16, 17 are alike in the preferred form of my invention, and I have confined the detailed part of the description to the arm 16, It will be sufficient therefore to observe merely that the clamp arm 17 includes a mounting portion 118, a main portion 119, and clamp fingers 124, 125, 126, and 127, as best seen in Fig. 6. These fingers and the clamp pads 128 and 129 coact in the same way as do those on the arm 16. It is conceivable, however, that I may utilize my novel construction merely in one of the opposed arms 16, 17, and I do not wish to be limited to arms that are alike.

I believe that the operation and advantages of my novel load clamp will now be understood, and that the very considerable value of my invention will be fully appreciated by those skilled in the art.

I now claim:

1. In a load clamp of the class described, a yielding clamp arm adapted to extend longitudinally from an industrial truck, means mounting said yielding clamp arm at one end on the truck for clamping movement relatively to an opposed clamp arm, said yielding clamp arm bending when clamping a load relatively to the opposed arm, a clamp pad for said yielding arm, means securing the clamp pad in integral relation to a portion of its arm with clearance between the remainder of that arm and the pad, and said securing means being offset in a direction away from the base of the arm relatively to the center of the pad whereby the pad when clamping the load imparts reverse bending to its arm.

2. In a combination of the class described, a pair of yielding arms adapted to extend longitudinally from an end of an industrial truck, means mounting said arms at their inner ends for moving toward and away from one another, a clamp pad of large area for each of said arms, means securing each of said pads to the outer end of its corresponding arm, said pads, said arms and said securing means being formed and constructed so that said pads are held initially spaced from the remainder of said arms, said securing means for each pad being offset relatively to a medial portion of the pad area and in a direction away from the inner end of the corresponding arm, and a portion of the securing means for each pad holding the pad against pivoting movement relatively to the outer end of its arm, so that the pressure of a load against each pad acting through the securing means will exert a reverse bending moment in said arms.

3. In a combination of the class described, a pair of arms adapted to extend longitudinally from an end of an industrial truck, means mounting said arms at their inner ends for moving toward and away from one another, a forward yielding finger and a rearward yielding finger formed as an integral part of each arm, a clamp pad of large area for each of said fingers of each arm, means securing each of said pads to the end of its corresponding finger, said pads, said fingers and said securing means being formed and constructed so that said pads are held initially spaced from the remainder of the corresponding fingers and arms, said securing means for each pad being offset relatively to a medial portion of the pad area and in a direction away from the base of the corresponding finger, and a portion of the securing means for each pad holding the pad against pivoting movement relatively to the end of its finger, so that the pressure of a load against said pads acting through their securing means will effect a reverse bending moment in said arms.

4. In a combination of the class described, a pair of plates adapted to extend longitudinally from an end of an industrial truck, means mounting said plates at their inner ends for moving toward and away from one another, each plate being cut away to form as integral parts thereof longitudinally extending forward upper and lower fingers and rearward upper and lower fingers, each of said fingers forming with its plate a yielding beam, a clamp pad of large area for each pair of forward fingers and each pair of rearward fingers on said plates, means securing each pad to the ends of its corresponding fingers, said pads, said fingers and said securing means being formed and constructed so that said pads are held initially spaced from the remainder of the corresponding fingers and beams, a portion of the securing means for each pad holding that pad against pivotal movement relatively to the ends of its fingers, and said securing means for each pad being offset relatively to a medial point on the pad in a direction away from the base of the corresponding fingers, so that the pressure of a load against said pads will exert a reverse bending moment in said yielding beams.

5. In a combination of the class described, a pair of yielding plates adapted to extend longitudinally from an end of an industrial truck in a vertical position, means mounting said plates at their inner ends for moving laterally toward and away from one another for gripping a load therebetween, each of said plates being cut away to form upper and lower rear fingers and upper and lower forward fingers, said fingers being bent out of the planes of the plates so as to taper inwardly laterally toward the load therebetween, and with said rear fingers extending rearwardly from said plate and said forward fingers extending forwardly from said plate, a clamp pad of large area for each pair of forward fingers and each pair of rear fingers on said plates, means securing each of said pads in integral relation to the ends of the corresponding fingers and supporting each pad with clearance between the pad and the remainder of the corresponding fingers and plate, and said securing means for each pad being offset relatively to the center of the pad in a direction away from the base of the corresponding fingers, whereby said clamp pads will exert a reverse twisting or bending force on said fingers at said securing means while simultaneously pressing said fingers toward the planes of the plates.

6. In a combination of the class described, a pair of arms adapted to extend longitudinally from an end of an industrial truck, means mounting said arms at their inner ends for movement toward and away from one another, said arms having forwardly and rearwardly extending yieldable portions integral therewith, clamp pad means, means securing said clamp pad means to the ends of said yieldable portions to form an integral part thereof, said clamp pad means, said securing means and said yieldable portions being formed and constructed so that said pads are held initially spaced relatively to the hremainder of said yieldable portions and arms, the application of pressure between said clamp pad means and a load being effective through bending of said yieldable portions to move said clamp pad means and yieldable portions integrally, and the area of said clamp pad means being centered in positions offset relatively to the ends of said yieldable portions in a direction toward the base of said yieldable portions, so that the clamping pressure will be effective through reverse bending of the yieldable portions to move the pad means relatively to those portions.

7. In a load clamp of the class described, a yielding clamp arm adapted to be mounted on an industrial truck for clamping movement relatively to an opposed clamp member, a load engaging clamp pad, means securing the clamp pad to said yielding clamp arm so that the pressure on said pad due to the clamping of a load will exert in said arm a bending moment in an outward direction, said yielding clamp arm extending longitudinally from its mounting past a medial portion of said clamp pad while in spaced relation to the pad and then extending to said means that secure the pad to the arm, and said securing means including a portion through which the yielding clamp arm will accept inward bending moment due to the clamping pressure of the pad, whereby to effect reverse bending of that part of the arm that extends past the medial portion of the pad.

8. A clamp arm for a lift truck comprising a thin steel integral plate adapted to be secured at its inner end to the truck and extending longitudinally outwardly endwise from the truck with its plane substantially vertical, said thin plate having vertical and lengthwise dimensions to provide a relatively large plate area, said integral plate having parts thereof cut away to form narrow finger-like integral plate portions capable of considerable flexing relatively to the remainder of the plate because of their narrowness and length, and a relatively large wide clamping pad much wider and far greater in area than said finger-like portions positioned in bearing relation to both said integral narrow finger-like portions of the plate, means rigidly securing said pad to at least one of the outer ends of said finger-like portions, said pad, said fingers and said securing means being formed and constructed so that said pad is held initially substantially parallel and spaced from the plane of the plate so that said pad can move bodily through the flexing of said integral finger-like portions of the plate while contributing a large surface for contact with relatively fragile cartons.

References Cited in the file of this patent
UNITED STATES PATENTS

| | | |
|---|---|---|
| 2,554,433 | Warren | May 22, 1951 |
| 2,635,774 | Backofen et al. | Apr. 21, 1953 |
| 2,674,387 | Ehmann | Apr. 6, 1954 |
| 2,675,935 | Thurow | Apr. 20, 1954 |
| 2,681,162 | Ehmann | June 15, 1954 |
| 2,727,779 | Phillips | Dec. 20, 1955 |
| 2,742,316 | Phillips | Apr. 17, 1956 |
| 2,822,209 | Cichaczewski | Feb. 4, 1958 |
| 2,844,403 | Farmer et al. | July 22, 1958 |